US010671404B2

(12) United States Patent
Muralidhar et al.

(10) Patent No.: US 10,671,404 B2
(45) Date of Patent: *Jun. 2, 2020

(54) SYSTEMS, METHODS AND DEVICES FOR DYNAMIC POWER MANAGEMENT OF DEVICES USING GAME THEORY

(71) Applicant: INTEL CORPORATION, Santa Clara, CA (US)

(72) Inventors: Rajeev D. Muralidhar, Bangalore (IN); Harinarayanan Seshadri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/896,534

(22) Filed: Feb. 14, 2018

(65) Prior Publication Data

US 2018/0173538 A1 Jun. 21, 2018

Related U.S. Application Data

(62) Division of application No. 15/084,268, filed on Mar. 29, 2016, now Pat. No. 9,934,048.

(51) Int. Cl.
*G06F 1/24* (2006.01)
*G06F 9/4401* (2018.01)
(Continued)

(52) U.S. Cl.
CPC ............ *G06F 9/4411* (2013.01); *G06F 1/263* (2013.01); *G06F 1/3212* (2013.01);
(Continued)

(58) Field of Classification Search
CPC ...... G06F 9/4411; G06F 9/4418; G06F 1/263; G06F 1/3212; Y02D 10/174
(Continued)

(56) References Cited

U.S. PATENT DOCUMENTS 7,421,601 B2 9/2008 Bose et al.
9,785,130 B2 * 10/2017 Hooshmand ........... G05B 15/02
(Continued)

FOREIGN PATENT DOCUMENTS

KR 1020070099181 10/2007

OTHER PUBLICATIONS

U.S. Appl. No. 15/084,268, Non-Final Office Action, dated Jun. 29, 2017, 12 pages.
(Continued)

*Primary Examiner* — Volvick Derose
(74) *Attorney, Agent, or Firm* — Green, Howard & Mughal LLP

(57) ABSTRACT

Dynamic power management of integrated devices can be accomplished using game theory. In an example, power demands for individual devices (e.g., CPU, GPU, communications, etc.) can be controlled by governors. An engine can determine a system condition (e.g., docked or undocked) and use a reward and/or penalty matrix to determine power settings to provide to governors. Periodically, the engine can reevaluate the system condition and power settings for the governors. For example, device components can be modeled as players in a game. In the case of idle power management scenarios, the players can deploy cooperative gaming strategy to allow the system to be in a low power state.

14 Claims, 8 Drawing Sheets

(51) Int. Cl.
*G06F 1/26* (2006.01)
*G06F 1/3212* (2019.01)
*G06F 8/65* (2018.01)

(52) U.S. Cl.
CPC .............. *G06F 9/4418* (2013.01); *G06F 8/65* (2013.01); *Y02D 10/174* (2018.01)

(58) Field of Classification Search
USPC ........................................................ 713/100
See application file for complete search history.

(56) References Cited

U.S. PATENT DOCUMENTS

| | | | | |
|---|---|---|---|---|
| 10,061,283 B2* | 8/2018 | Wong | ................... | G05B 19/042 |
| 2009/0270138 A1* | 10/2009 | Raveendran | ......... | H04N 21/443 |
| | | | | 455/574 |
| 2011/0055597 A1* | 3/2011 | Wyatt | ................ | G05B 13/0275 |
| | | | | 713/300 |
| 2012/0127183 A1* | 5/2012 | Vonog | ................... | G06F 9/5072 |
| | | | | 345/506 |
| 2012/0254633 A1* | 10/2012 | Vilhauer | ................ | G06F 1/3212 |
| | | | | 713/300 |
| 2012/0316689 A1* | 12/2012 | Boardman | .......... | H02J 13/0079 |
| | | | | 700/292 |
| 2013/0074077 A1* | 3/2013 | Miller | ................... | G06F 1/3203 |
| | | | | 718/100 |
| 2014/0068285 A1* | 3/2014 | Lee | ......................... | G06F 1/324 |
| | | | | 713/300 |
| 2014/0189377 A1* | 7/2014 | Subbareddy | .............. | G06F 9/44 |
| | | | | 713/300 |
| 2015/0309551 A1* | 10/2015 | Yeager | ................ | G06F 1/3203 |
| | | | | 713/320 |
| 2016/0092986 A1* | 3/2016 | Lian | ...................... | G06Q 30/08 |
| | | | | 700/295 |
| 2016/0342198 A1 | 11/2016 | Hsu et al. | | |

OTHER PUBLICATIONS

U.S. Appl. No. 15/084,268, Notice of Allowance, dated Nov. 30, 2017, 7 pages.

Khan, et al., "A Cooperative Game Theoretical Technique for Joint Optimization of Energy Consumption and Response Time in Computational Grids", IEEE Transactions on Parallel and Distributed Systems, vol. 20, No. 3, Mar. 2009, 15 pages.

PCT/US2017/015866, International Search Report and Written Opinion, dated May 12, 2017, 17 pages.

University of Wyoming, "Step by step guide on how to find a Nash Equilibrium or Equilibria", https://web.archive.org/web/20151231155159/http://www.uwyo.edu/shogren/jaysho/nashnotes.pdf, Dec. 31, 2015, 3 pages.

* cited by examiner

SYSTEMS, METHODS AND DEVICES FOR DYNAMIC POWER MANAGEMENT OF DEVICES USING GAME THEORY

RELATED APPLICATIONS

This application is a divisional of, and claims the benefit of priority of, U.S. patent application Ser. No. 15/084,268, filed Mar. 29, 2016, issued as U.S. Pat. No. 9,934,048, on Apr. 3, 2018, which is hereby incorporated by reference herein in its entirety.

TECHNICAL FIELD

The present disclosure relates to power management and, more specifically, to dynamic power management of integrated devices using game theory.

DETAILED DESCRIPTION

Figure 1:
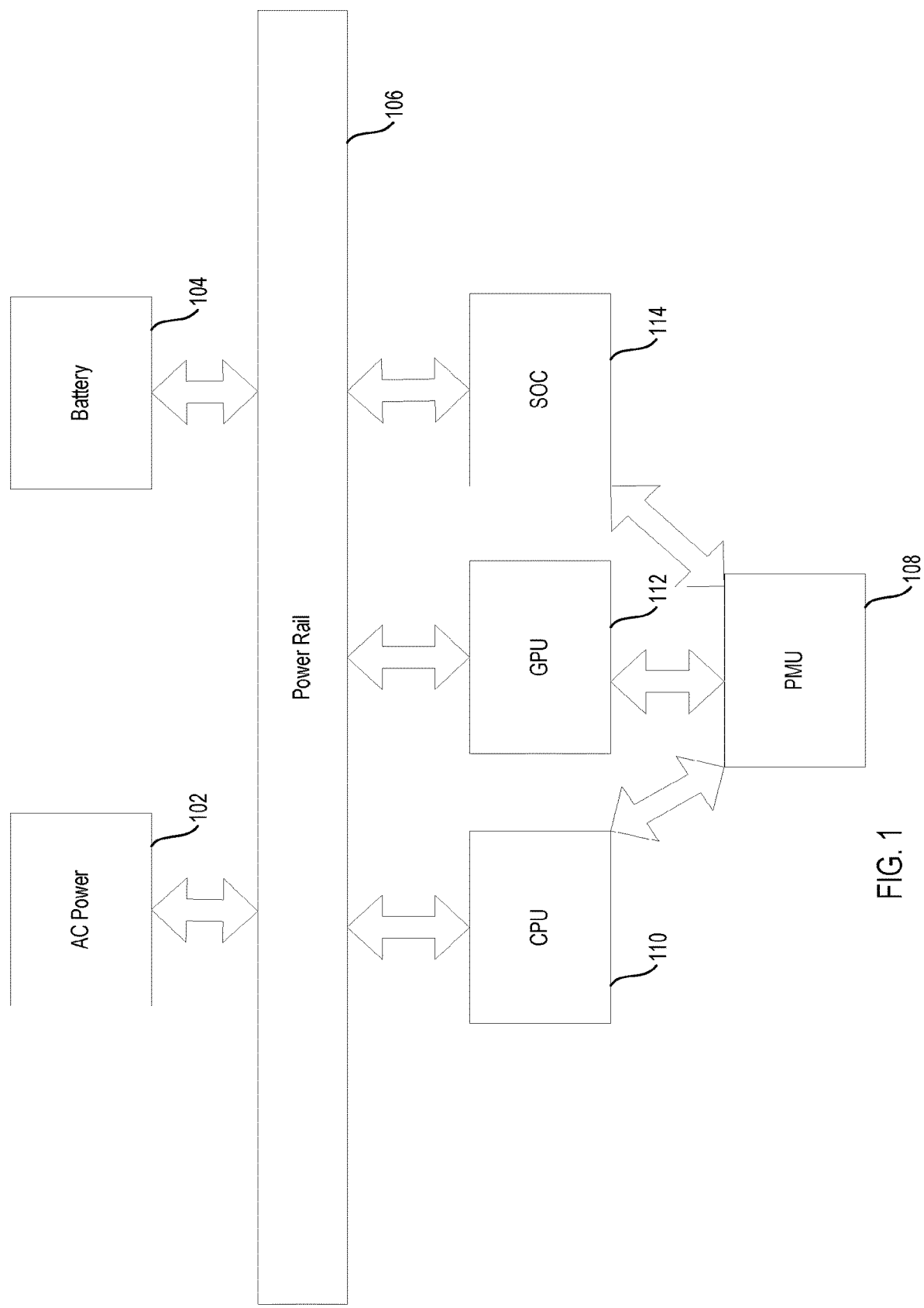
FIG. 1 is a diagram illustrating a power management system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable dynamic power management of integrated devices using game theory. In an example and in an energy distribution system, power demands from a power source for individual devices (e.g., CPU, GPU, communications, etc., which can be known as power sinks) can be controlled by governors. An engine can determine a system condition (e.g., docked or undocked) and use a reward and/or penalty matrix to determine power settings for the power sinks to provide to governors. Periodically, the engine can reevaluate the system condition and power settings for the governors.

For example, device components can be modeled as players in a game. In the case of idle power management scenarios, the players can deploy cooperative gaming strategy to allow the system to be in a low power state.

In an example of active scenario embodiments, two situations can be addressed: (1) maximizing self-utility (e.g., a Nash equilibrium); and (2) a social optimum strategy. In a (1) Nash equilibrium, which is named after the famous John Nash, each component uses a best-response strategy for maximizing its own utility. A Nash equilibrium is a solution of a non-cooperative game involving two or more players, in which each player is assumed to know the equilibrium strategies of the other players, and no player has anything to gain by changing only his or her own strategy. If each player has chosen a strategy and no player can benefit by changing strategies while the other players keep theirs unchanged, then the current set of strategy choices and the corresponding payoffs constitute a Nash equilibrium.

In (2) a social optimum strategy, the components employ strategies that aim to maximize the overall utility of the system (socially optimal). It is to be noted that social optima may not be Nash equilibria necessarily. In some embodiments, this social optimum strategy falls under a category of games described as a tragedy of the commons. In this category, individuals acting independently and rationally according to each's self-interest behave contrary to the best interests of the whole group by depleting some common resource. In some examples of the strategy applied to a device, the common resource is a battery of the device. Active power scenarios can be analyzed as a game and solved for a globally optimum case of conserving power for the system as a whole.

Game theory can be used in modeling system power management strategies on complex systems/devices. A game theoretic approach can model the system power consumption and component strategies and provide a formal methodology to devise, specify, implement and verify power management strategies at different levels (e.g., hardware (HW), firmware (FW), software (SW), etc.).

Power management of complex systems, ranging from the high performance computing (HPC) systems to smaller systems on a chip (SOCs), phones, tablets, internet of things (IOTs), etc., has been typically implemented through a combination of coarse and fine-grained strategies, most of which are fine-tuned in a platform-specific manner.

Currently, in active scenarios where there can be conflicting energy needs or requests between components (sometimes referred to as IPs, e.g., central processing unit (CPU), graphics (Gfx), support circuitry, etc.), there is some limited form of energy sharing implemented in power unit firmware (PUNIT FW) or power unit code (PCODE) in SOCs. These implementations can be SOC specific, and can have specific tunable limits on SOC energy sharing (e.g., an Energy Sharing Bias that can be pre-configured). As SOCs become more complex, energy is shared between CPUs, GPUs, imaging, and complex components like device interconnect, etc. for active use cases. For example, simple SOC-specific implementations might not scale easily for multiple components as well as uncoordinated power and/or performance strategies from each component.

A game theoretic approach can be used in dynamic power management strategies. For example, use cases on some SOC systems fall under a form of cooperative and/or non-cooperative gaming strategies. Idle power management strategies fall under cooperative games, while active scenarios can be considered as dynamic non-cooperative games. Power savings can be increased on devices during active scenarios by modeling the energy consumption problem across components and the system as a whole as a dynamic non-cooperative game. For example, each component is a player in the game that simultaneously consumes a common resource (battery). In such scenarios, energy savings can be maximized or increased when a representative of each component attempts to achieve an equilibrium. An example of one equilibrium is the Nash equilibrium.

Formulating power management strategies in HW, FW, and/or SW as games provide a formal methodology that can enhance power management specifications, implementations and validations at different levels. Game theory is a branch of applied mathematics that describes how rational entities make decisions in a situation of conflict, provides tools, and analyzes interactions among the rational entities. In particular, it has been used to model and analyze multi-agent system broadly.

There are several classification of games, some of which are: (1) cooperative and non-cooperative games; (2) zero-sum and non-zero-sum games; (3) simultaneous and sequential games; (4) perfect information and imperfect information games; and (5) pure strategy and mixed strategy games. For example:

(1) Cooperative and Non-Cooperative Games: In cooperative games, players can cooperate with each other for a larger common cause (and stick to a previous commitment). In non-cooperative games, they can operate in their own self-interest.

(2) Zero-Sum and Non-Zero-Sum Games: In zero-sum games, the fortunes of the players can be inversely related, which means a player wins exactly the same amount of other opponents' loss.

(3) Simultaneous and Sequential Games: Simultaneous games are games where players can move together at the same time. On the other hand, sequential games (also called dynamic games) can be games where the later players will move after knowing some earlier actions.

(4) Perfect Information and Imperfect Information Games: Perfect information describes the situation that players know who the other players are, what their possible strategies/actions are, and what payoff functions are. Imperfect information can mean that some players are unaware of the exact actions strategies chosen by other players and/or details of payoff functions.

(5) Pure Strategy and Mixed Strategy Games: Given the information of the system, a pure strategy game represents that only one specific strategy can be chosen, while a mixed strategy game allows players to randomly select a pure strategy by certain probability.

System power management can be modeled as a gaming scenario, including cooperative and/or non-cooperative scenarios. Cooperative gaming scenarios in system management can include (1) CPU and memory power management, (2) device idle power management and (3) system idle power management.

1. CPU and Memory Power Management: When a CPU core load starts dropping, this is the sequence of events that is can occur: OS driver monitors CPU load and requests that CPU enter C6 state. Caches are flushed; CPU cores are power gated. Memory controller sees the drop in memory traffic and enters self-refresh state. CPU and memory cooperate with each other to reduce overall system power.

2. Device Idle Power Management: Each device autonomously uses its own idle detection/prediction mechanism (e.g., simple timer based, or based on hardware activity counters and/or bus activity, etc.). When idleness goes beyond a device-specific threshold, OS driver requests HW to enter low power state. This could be viewed as an internal strategy that, when adopted, aids a larger system-wide cooperative strategy (next point). Devices operate under previously committed strategy to reduce power as much as possible.

3. System Idle Power Management: When CPUs are idle, devices are idle, memory and system controllers are idle (USB, PCI, etc.), and firmware/hardware orchestrate all other components to enter system-wide low power states (S0ix). This illustrates system-wide optimal power strategy when all players are playing a cooperative strategy.

Non-cooperative gaming scenarios in system management can include (1) SOC energy sharing and (2) thermal conditions.

1. SOC Energy Sharing: Multicore CPUs can be powered by one or multiple voltage rails (VCC0, VCC1, etc.). Other high performance components like Graphics, multimedia, display (HDMI, Thunderbolt, etc.), Camera/ISP, etc. are powered by one or more rails. In some embodiments, a single multimedia rail (VMM) is used for high performance components, and a shared rail (Vnn) is used for everything else on the SOC except the CPU cores. Regardless of the number of rails and the partitioning, the energy capacity that can be delivered from the power delivery unit (PMIC) is limited by design constraints. For example, there can be a limit of 6-8 A on the platform as a whole, regardless of which rail is at which performance and/or voltage level. In such scenarios, components requesting higher CPU performance (via operating system (OS) and/or governors) can conflict with a request from a graphics driver to boost up graphics performance state. A mitigation strategy can be enforcing energy sharing implemented by SW and/or FW. For example, a SOC-wide policy of how much priority could be given for CPU, Gfx, ISP, etc. can be implemented. If requests go beyond a pre-programmed energy bias setting, the enforcing entity will reject performance boost requests. Each HW entity can use a notion of energy credit, a way of accounting for use of energy. This accounting is used to build energy credits across components. The accounting can be based on the energy sharing bias and/or policy, including currently consumed energy credits. Enforcement can be implemented to use this accounting.

2. Thermal Conditions: In some embodiments, thermal events take a highest priority. Thermal enforcement policies can range from throttling specific components (e.g., disable charging, dim the display, etc.) to applying a range of priority-based throttling (e.g., throttle a CPU first, next throttle a display, then throttle charging, etc.). In catastrophic cases, thermal policy can be to shut the system down to prevent damage. Such scenarios can be viewed as a Stackelberg competition where there is an overall leader (thermal policy) that enforces the strategies of other players (e.g., throttling).

FIG. 1 shows an example system of centralized decision-making that can implement the power management using gaming scenarios. AC power 102 and battery power 104 are provided to a power rail 106. A power management unit (PMU) 108 determines power and/or performance settings for a CPU 110, a GPU 112 and other SOC circuitry 114 using a game theory scenario between players.

For example, when AC power 102 is available through the power rail 106, the PMU 108 can select power settings (or other settings impacting power) for the CPU 110, GPU 112 and/or SOC circuitry 114 up to a power, performance and/or thermal limit of the device. A game theory model can use rewards and penalties to encourage performance over other values.

In another example, when battery power 104 is available through the power rail 106, the PMU 108 selects power settings (or other settings impacting power) for the CPU 110, GPU 112 and/or SOC circuitry 114 based on a conservation of battery while meeting performance requests. A game theory model can use rewards and penalties to encourage conservation of battery over other values.

Figure 2:
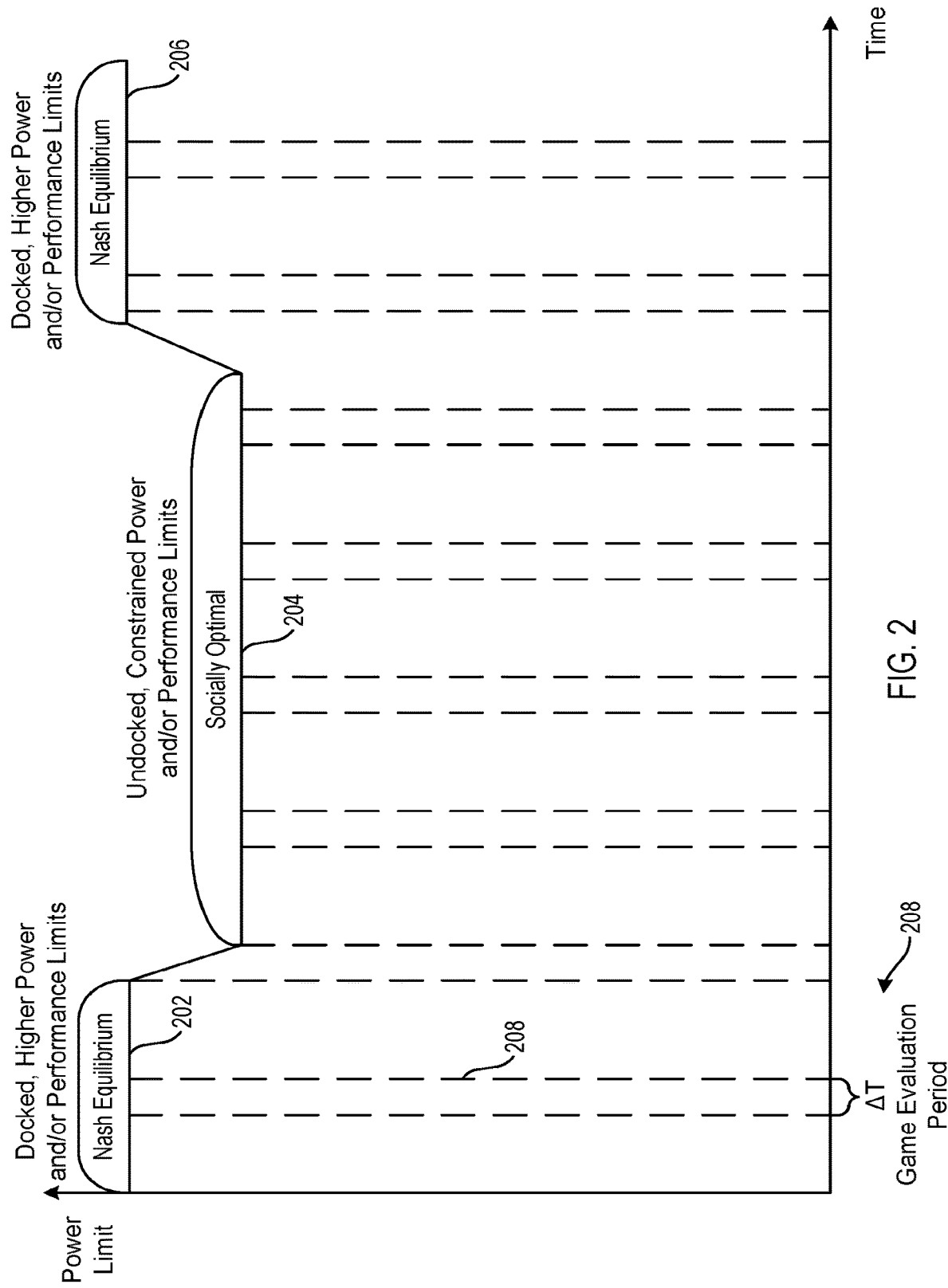
FIG. 2 is a graph illustrating power limit constraints consistent with embodiments disclosed herein.

FIG. 2 is a graph illustrating power limit constraints. For example, a mobile device (e.g., a phablet, phone, tablet, 2-in-1 system, etc.) operates through phases 202, 204, 206 of being docked in phases 202, 206 and undocked in phase 204. When the system is docked in phases 202, 206, components can usually get the performance they desire (based on the load). When the system is undocked in phase 204, residual battery energy becomes a precious resource. Hence it is beneficial for components to try to achieve power optimization strategies to increase overall battery life.

When the system is docked in phases 202, 206, each component (or representatives of each component in a game theory model) can try to achieve the best possible performance (even though this could ideally be done more optimally based on what is acceptable rather than unconstrained performance). This can be viewed as a case of each component trying to achieve Nash equilibrium (e.g., in phases 202, 206). When the system is undocked, power is a precious common resource, and hence each component can act in a manner that is socially optimal (e.g., to try and conserve battery as much as possible such as in phase 204). A system can evaluate the performance, scenario and/or strategy during game evaluation periods 208. The evaluation can occur periodically, based on triggers (e.g., a change in status (charging vs. battery), values, etc.).

The evaluation periods 208 can be viewed as an infinite game that transitions through docked and undocked situations with periodic game evaluations. An evaluation period 208 can be used to examine, for each enumerated component, one or more system conditions (e.g., docked/undocked), component load and/or utilization, component historical data (e.g., how much power it consumed previously—which can be an average, weighted average over time), and/or cost of a strategy (using unconstrained DVFS might deplete battery power rapidly). By the end of each evaluation period 208, each component (or representative of a component, e.g., management unit, governor, etc.) determines a predicted best possible response strategy that either can be socially optimal (when undocked) or can satisfy a Nash equilibrium (when docked).

For example, a game analysis for a computing system can be solved using the following game. There are N players ($P_1$, $P_2$, ..., $P_N$) and each player is a component/device of the system. S is a strategy space used by players. For example, the CPU strategies can be:

$$S_{CPU} = \{S0_{CPU}, S1_{CPU}, \ldots, SM_{CPU}\}.$$

As, seen in the above equation, M+1 strategies can be used by the CPU. At any point T, the residual energy of the battery is $E_{T_R}$. Player $P_i$'s energy consumed during period T by $E_{iT}$. $E_{0T}$ is the energy consumed by its "basic strategy" that involves no power management.

Hence, it follows that the energy that can be consumed by players at every period T is constrained by the residual energy of the device:

$$\sum_{i=1}^{PN} E_{iT} \leq E_{T_R}$$

The energy that would remain if no power optimization strategy is used by players is:

$$X_{T_R} = E_{T_R} - \Sigma E_{0T}$$

If each player uses power optimization strategies, each player will produce an energy savings of $ES_{k_i}$, where i is the player index, and k is the strategy used.

Hence the residual energy for period T+1 is given by:

$$E_{T+1_R} = E_{T_R} - \Sigma E_{0T} + \Sigma ES_{k_i}$$

Maximizing $ES_{k_i}$ can maximize the utility, and hence the power consumption overall of the platform.

In a social optima example, $ES_{k_i}$ is to be divided among the players in a ratio among SOC components as given by a platform energy bias. For example, if the policy is to share the energy between CPU, Gfx, components and the rest of the SOC in a specific ration, then the residual power is divided appropriately between components. Each component will then pick an energy state according to the energy budget provided by the socially optimal case.

In a Nash equilibrium example, $ES_{k_i}$ is to be divided among the players in an estimated optimal manner. In this example, each player will request the performance it anticipates, and the system can grant this assuming no other limiting constraint (thermal, power budget, etc., for example). This can be a Nash equilibrium—where each player has chosen a strategy and no player can benefit by changing strategies while the other players keep theirs unchanged.

In another example, an implementation of game theory models for active state power management can be used. In active scenarios, there is some limited form of energy sharing implemented in PUNIT FW in SOCs. These implementations can be SOC specific and can have limits on SOC energy sharing. Using a game theoretical approach can enable more robust and generic solutions for active state power management due to mapping between such scenarios and games (non-cooperative, repetitive games, etc.).

A game theory based firmware, software and/or hardware can be implemented as illustrated below at device level (to come up with different strategies), and at system level to enforce/guide the system towards different strategies (PUNIT, PMC Firmware can implement such systems).

Figure 3:
FIG. 3 is a table of a payoff matrix for a docked scenario consistent with embodiments disclosed herein.
Figure 4:
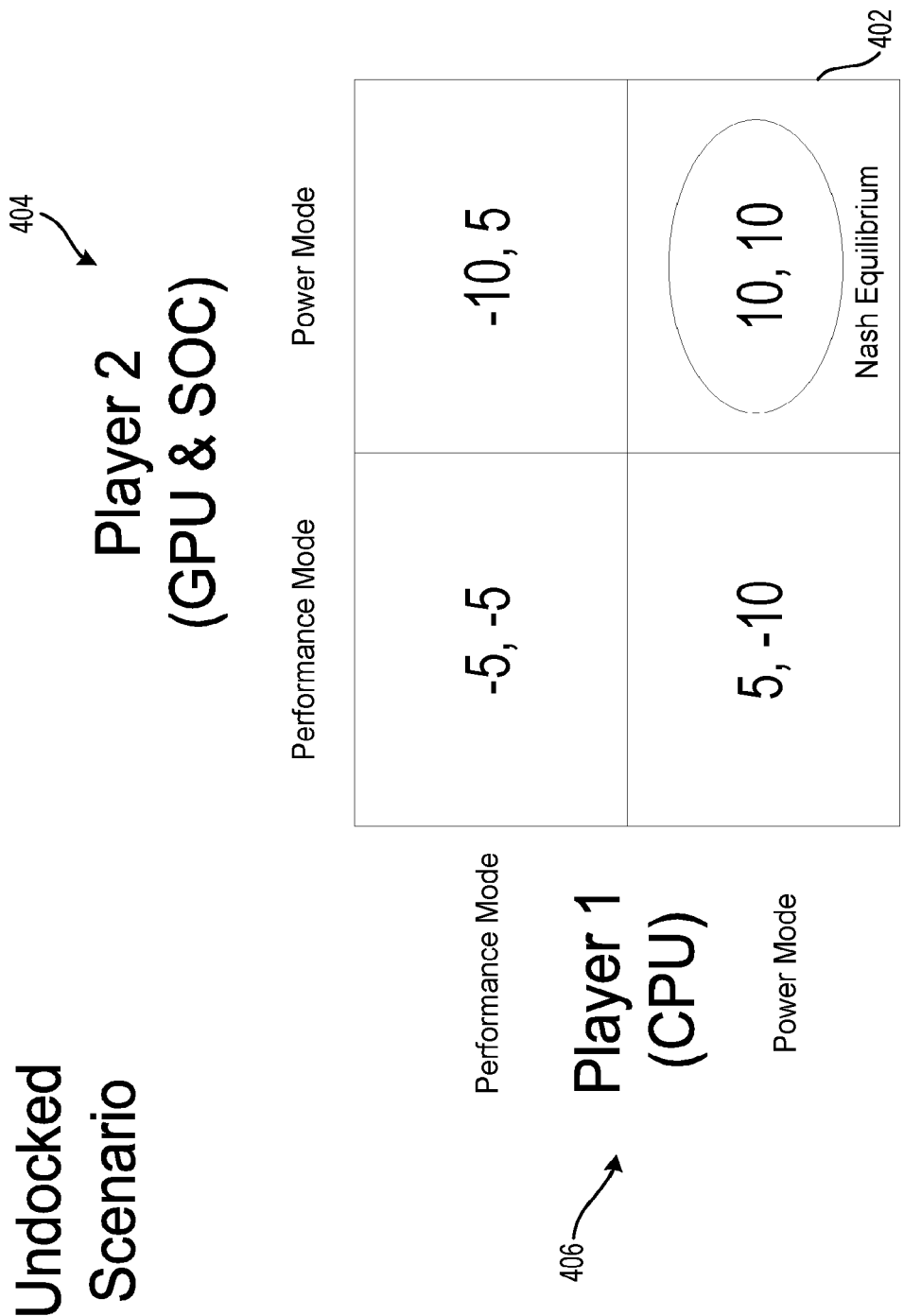
FIG. 4 is a table of a payoff matrix for an undocked scenario consistent with embodiments disclosed herein.

In FIGS. 3-4, an example of game theoretic approach in power management is shown. In these examples, a simple case of two players is considered. Player 1 is a CPU (e.g., quad core CPU). Player 2 is a GPU and a rest of SOC circuitry.

A reward/penalty is based on the strategies chosen by the players at any period of time. It is to be noted that this specific case of game formulation was used as an analogy for social cooperation, since much of the benefit that people gain in society depends upon people cooperating and implicitly trusting one another to act in a manner corresponding with cooperation. Hence Nash equilibrium gravitates towards social equilibrium as illustrated by the payoff matrices below.

FIG. 3 is a table of a payoff matrix 302 for a docked scenario. If Player 1 (306) chooses Performance Mode, and Player 2 (304) chooses Performance Mode, rewards are (10, 10) for both. This is represented by high quality of service and/or user experience. In a simplistic scenario, there is no loss of battery power due to external power.

If Player 1 (306) chooses Performance Mode, and Player 2 (304) chooses Power Mode, rewards are (10, 5) for both. This is represented by high quality of service and/or user experience for Player 1, and a loss of the same for Player 2.

If Player 1 (306) chooses Power Mode, and Player 2 (304) chooses Performance Mode, rewards are (5, 10) for both. This is represented by high quality of service and/or user experience for Player 2, and a loss of same for Player 1.

If Player 1 (306) chooses Power Mode, and Player 2 (304) chooses Power Mode, rewards are (5, 5) for both players. This is represented by lower quality of service and/or user experience for both.

FIG. 4 is a table of a payoff matrix 402 for an undocked scenario. If Player 1 (406) chooses Performance Mode, and Player 2 (404) chooses Performance Mode, rewards are (−5, −5) for both. This can represent a loss of battery if both players attempt to boost performance in an undocked scenario.

If Player 1 (406) chooses Performance Mode, and Player 2 (404) chooses Power Mode, rewards are (−10, 5) for both players. This is represented by penalty for Player 1 (406) for requesting boost performance when sharing a precious resource (battery), and a corresponding reward for Player 2 (404). If Player 1 (406) chooses Power Mode, and Player 2 (404) chooses Performance Mode, rewards are (5, −10) for both players for a same reasoning as above.

If Player 1 (406) chooses Power Mode, and Player 2 (404) chooses Power Mode rewards are (10, 10) for both players. This represents rewards for both players for choosing a socially optimal case, rather than what is individually beneficial.

Figure 5:
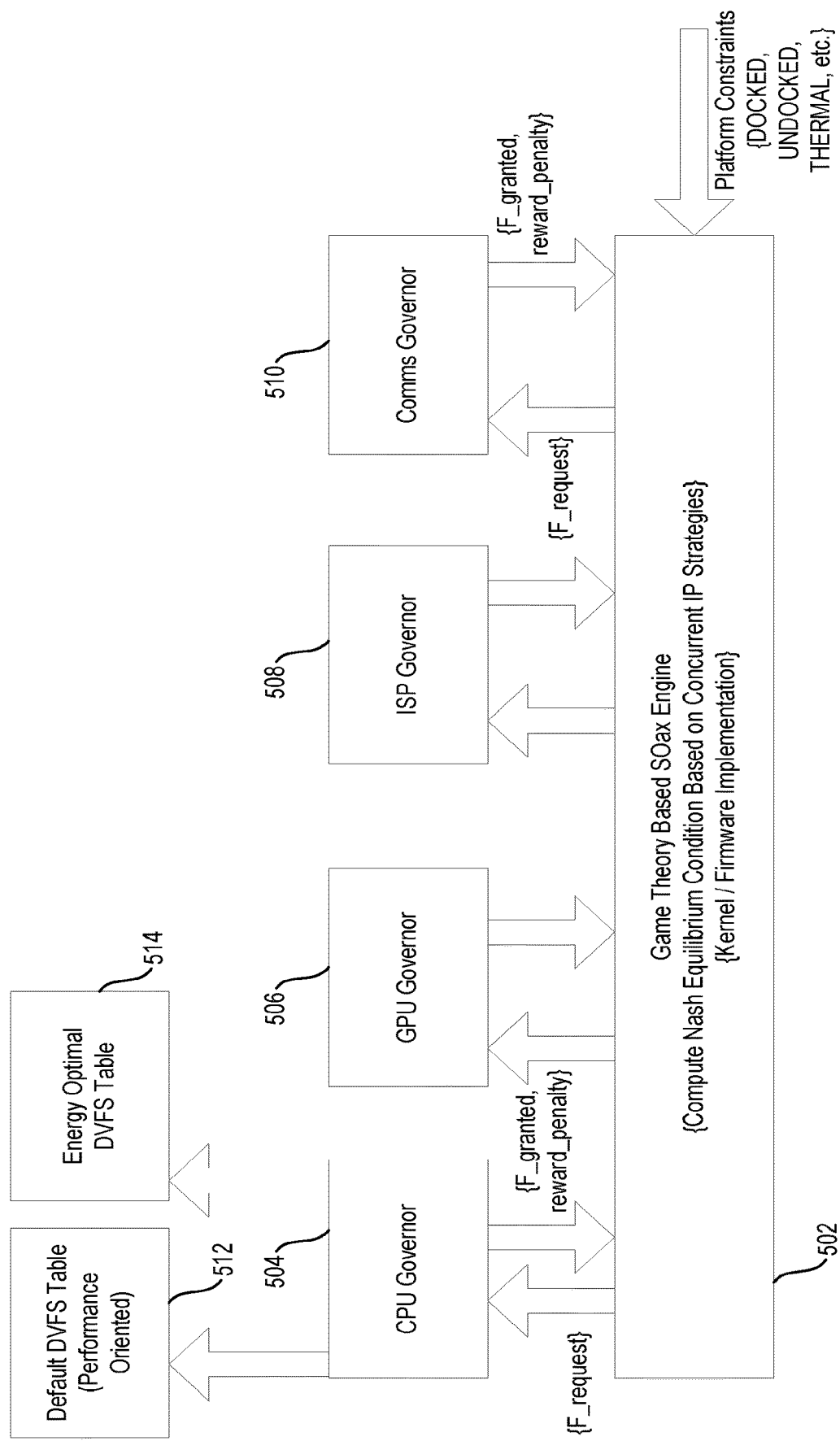
FIG. 5 is a block diagram of an engine and governors consistent with embodiments disclosed herein.

FIG. 5 shows the game theoretic approach applied at a device level. A game theory engine 502 can communicate with governors (e.g., CPU governor 504, GPU governor 506, ISP governor 508, communications governor 510, etc.). The governors 504, 506, 508, 510 can provide a request (e.g., F_request) to the engine 502. The engine 502 can calculate (or estimate) an optimum setting for each governor (e.g., power setting, voltage setting, frequency setting, a combination setting, etc.). The engine 502 can then return a response (e.g., F_granted, reward_penalty) that includes whether the request was granted and a reward and/or penalty.

These payoff matrices can be formed into an implementation at the device level and system level. The device can evaluate the payoff matrices and strategy at each evaluation period. For example, prior to the evaluation, a device (CPU, for example) has a default dynamic voltage and frequency scaling (DVFS) table 512 (or a P-state table, power selection table, etc.). A CPU governor (a P-state driver, for example) can use a CPU load (and/or architectural feedback such as from average performance (APERF)/maximum performance (MPERF) registers) as a metric, and based on that, select appropriate P-state for next duration between evaluations.

A device can also have an energy efficient P-state table 514 (or energy optimal DVFS table), where jumps between P-states are created with energy efficiency in mind (e.g., created by empirical measurement of cores). In other words, each device can have a default DVFS table (Strategy 1) and an energy efficient table (Strategy 2).

A game theoretic approach can be used at a device level. For example, the operations can include: Evaluate a system state. Compute Nash equilibrium based on the pre-determined payoff matrix. If docked, then a Nash equilibrium criteria can indicate that an estimated best possible response for either player is to request for performance. The system can use the regular DVFS table and strategy from Strategy 1.

If undocked, then a system optima can be more important than a local optimum. For example, the system can use the energy efficient P-state transition table. The DVFS strategies can be then more energy efficient for the system, using Strategy 2.

Based on the strategy used, the system can evaluate the reward and/or penalty based on outcome and then use the results for subsequent game strategy. This can aid in performing a dynamic game, where strategies can be continually evaluated and/or improved.

In another embodiment, a system level game engine (kernel/PMC Firmware) can be used at each evaluation period. The engine can evaluate the system state. The engine can compute a Nash equilibrium across entire system. For example, where some payoff matrices are device specific, the system can have a similar payoff matrix considering the full platform, components, rewards/penalties, other priorities/constraints, etc. Based on requests from different components and/or devices, the engine can compute a system condition. The engine can return a reward and/or a penalty back to each component for the performance requested.

In some embodiments, a P-state driver and/or CPU governor has a default P-state table or default DVFS table (as exposed by ACPI tables) 512. Analysis of energy optimal regions for the CPU, and which are the most energy efficient jumps for the CPU considering multiple vectors like power, performance, performance per Watt, temperature (degree per watt), etc. can be used to generate a new table (an energy efficient table 514) for the CPU governor that is more energy efficient.

Figure 6:
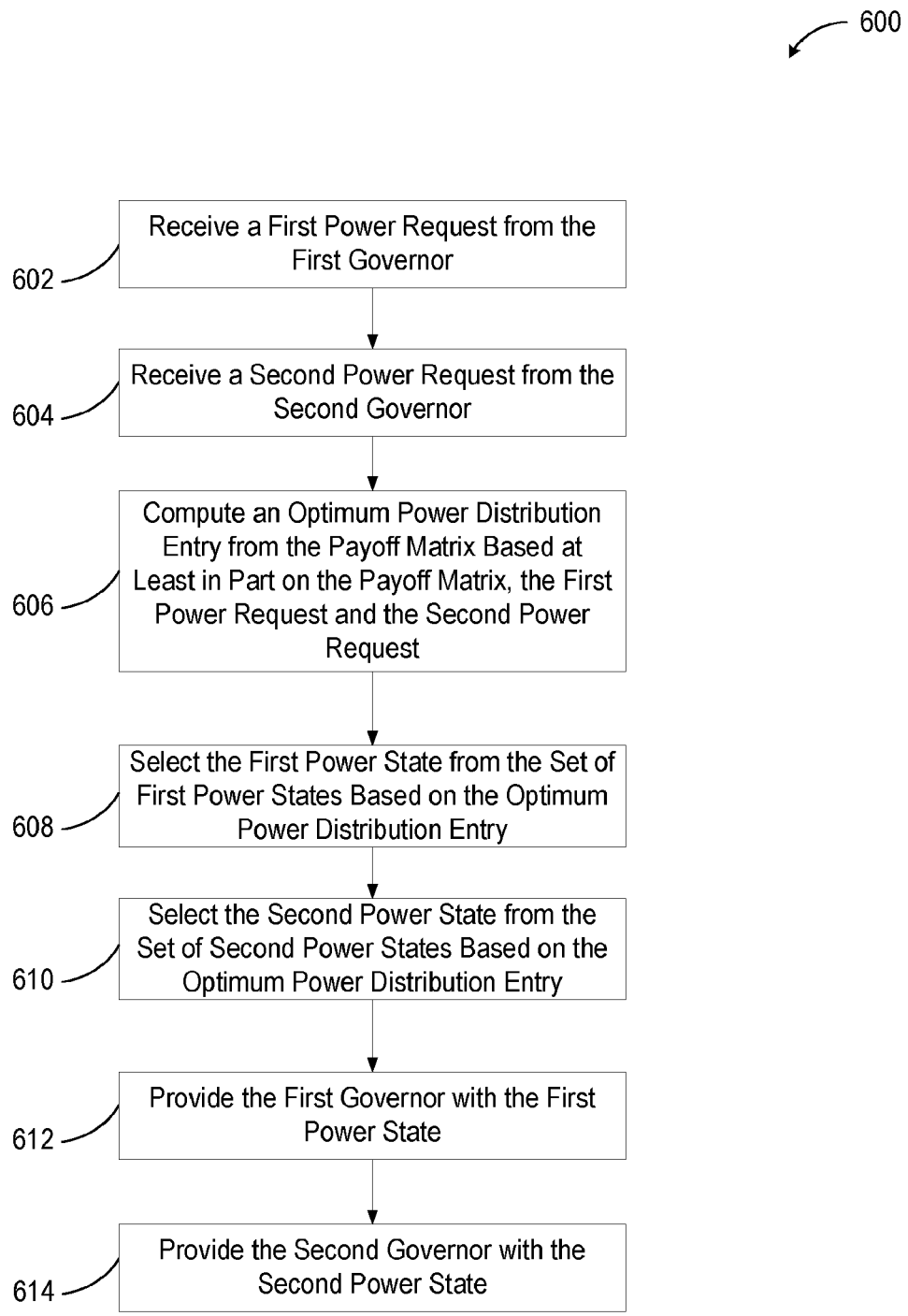
FIG. 6 is a flow chart illustrating a method for power management consistent with embodiments disclosed herein.

FIG. 6 shows a block diagram of a method 600 for dynamic power management of devices using game theory. The method 600 can be accomplished by various systems, including the systems shown in FIGS. 1, 5 and 7. For example, in block 602, an engine receives a first power request from a first governor. In block 604, the engine receives a second power request from a second governor. In block 606, the engine computes an optimum power distribution entry from the payoff matrix based at least in part on the payoff matrix, the first power request and the second power request. In block 608, the engine selects the first power state from the set of first power states based on the optimum power distribution entry. In block 610, the engine selects the second power state from the set of second power states based on the optimum power distribution entry. In block 612, the engine provides the first governor with the first power state. In block 614, the engine provides the second governor with the second power state.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
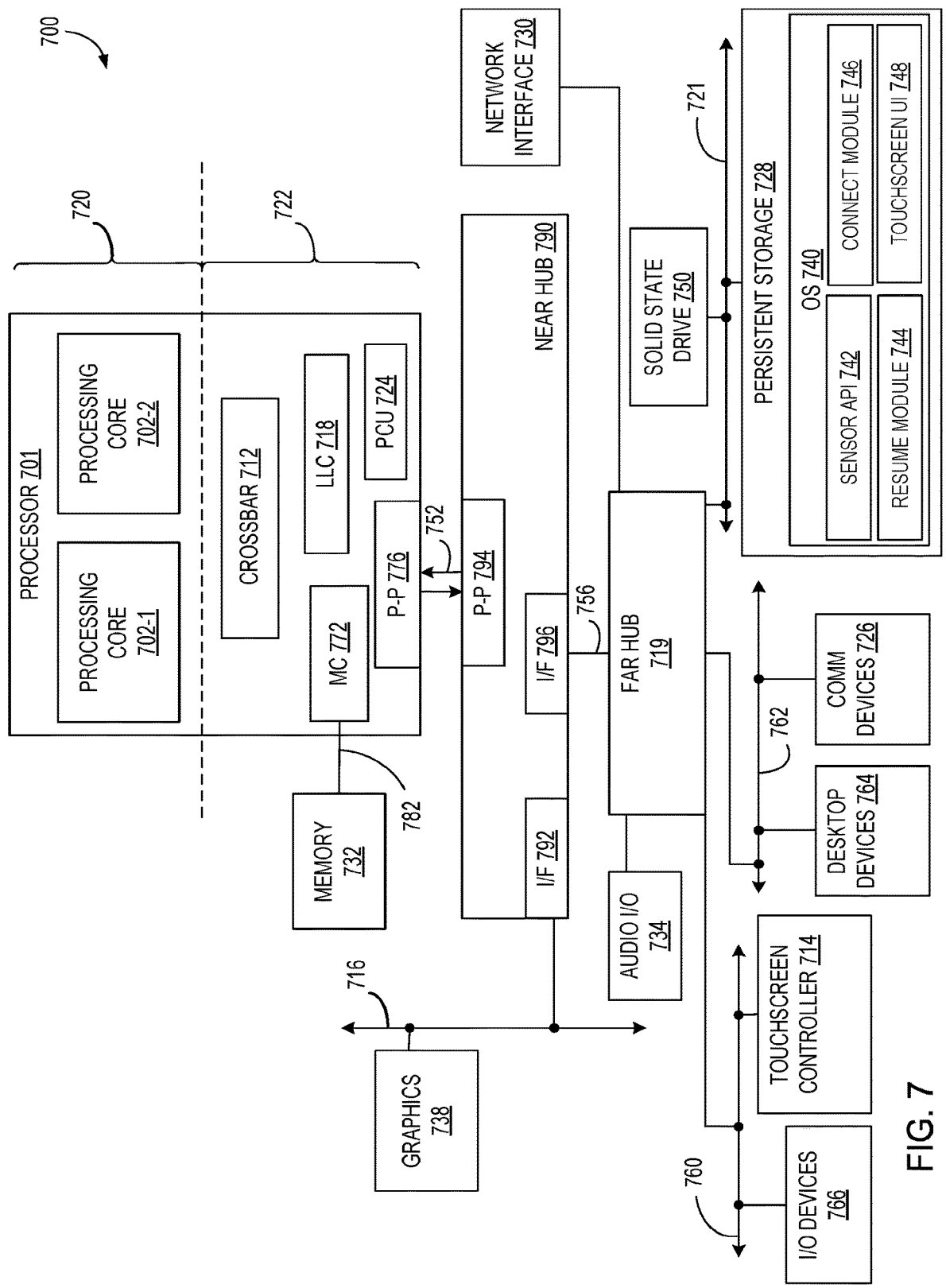
FIG. 7 is an example illustration of a computing system consistent with embodiments disclosed herein.

Embodiments may be implemented in many different platforms. FIG. 7 illustrates a computer system 700 used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor 701 is shown in FIG. 7 for descriptive clarity, in various embodiments, a different number of processors may be employed using elements of the illustrated architecture.

In at least one embodiment, the system 700 is a point-to-point interconnect system and includes the processor 701. While in some embodiments the system 700 may include only a single processor, in other embodiments, the system 700 may support multiple processors. In at least one embodiment, the processor 701 is a multicore processor including a first processing core 702-1 and a second processing core 702-2. It is noted that other elements of the processor 701 besides the processing cores 702 may be referred to as an uncore 722, while the processing cores 702 may also be referred to as a core region 720. In different embodiments, a varying number of cores may be present in a particular processor. In at least one embodiment, the processing cores 702 may comprise a number of sub-elements (not shown in FIG. 7), also referred to as clusters, that provide different aspects of overall functionality. The processing cores 702 may, in some embodiments, each include a memory cluster (not shown in FIG. 7) that may comprise one or more levels of cache memory. In some embodiments, other clusters (not shown in FIG. 7) in the processing cores 702 may include a front-end cluster and an execution pipeline cluster. In at least one embodiment, the processing cores 702 may include an L1 data cache. In some embodiments, the uncore 722 may include a crossbar 712, an LLC 718, a memory controller (MC) 772, a PCU 724 and a P-P interface 776. In some embodiments, the PCU 724 may be used to select a specific core based on the individual characteristics of each core on the die and the specification of the task.

In particular embodiments, the processing cores 702 within the processor 701 are not equipped with direct means of communicating with each other, but rather, communicate via the crossbar 712, which may include intelligent functionality such as cache control, data queuing, P-P protocols, and multicore interfacing. In some embodiments, the crossbar 712 may thus represent an intelligent uncore controller that interconnects the processing cores 702 with the MC 772, the LLC 718, and the P-P interface 776, among other elements. In particular, to improve performance in such an architecture, cache controller functionality within the crossbar 712 may, in some embodiments, enable selective caching of data within a cache hierarchy including the LLC 718 and one or more caches present in the processing cores 702. In at least one embodiment, the crossbar 712 is referred to as a global queue.

In at least one embodiment, the LLC 718 may be coupled to a pair of the processing cores 702, respectively. In some embodiments, the LLC 718 may be shared by the first processing core 702-1 and the second processing core 702-2. In some embodiments, the LLC 718 may be fully shared such that any single one of the processing cores 702 may fill or access the full storage capacity of the LLC 718. Additionally, in some embodiments, the MC 772 may provide for direct access by the processor 701 to a memory 732 via a memory interface 782. In some embodiments, the memory 732 may be a double-data rate (DDR) type dynamic random-access memory (DRAM), while the memory interface 782 and the MC 772 comply with a DDR interface specification. In at least one embodiment, the memory 732 may represent a bank of memory interfaces (or slots) that may be populated with corresponding memory circuits for a desired DRAM capacity.

In some embodiments, the processor 701 may also communicate with other elements of the system 700, such as a near hub 790 and a far hub 719, which are also collectively referred to as a chipset that supports the processor 701. In at least one embodiment, the P-P interface 776 may be used by the processor 701 to communicate with the near hub 790 via an interconnect link 752. In certain embodiments, the P-P interfaces 776, 794 and the interconnect link 752 are implemented using Intel QuickPath Interconnect architecture. In at least one embodiment, the near hub 790 includes an interface 792 to couple the near hub 790 with a first bus 716, which may support high-performance I/O with corresponding bus devices, such as graphics 738 and/or other bus devices. In some embodiments, the graphics 738 may represent a high-performance graphics engine that outputs to a display device (not shown in FIG. 7). In at least one embodiment, the first bus 716 is a Peripheral Component Interconnect (PCI) bus, such as a PCI Express (PCIe) bus and/or another computer expansion bus. In some embodiments, the near hub 790 may also be coupled to the far hub 719 at an interface 796 via an interconnect link 756. In certain embodiments, the interface 796 is referred to as a south bridge. The far hub 719 may, in some embodiments, provide I/O interconnections for various computer system peripheral devices and interfaces, and may provide backward compatibility with legacy computer system peripheral devices and interfaces. Thus, in at least one embodiment, the far hub 719 provides a network interface 730 and an audio I/O 734, as well as interfaces to a second bus 760, a third bus 762, and a fourth bus 721, as will be described in further detail.

In some embodiments, the second bus 760 may support expanded functionality for the system 700 with I/O devices 766 and a touchscreen controller 714, and may be a PCI-type computer bus. In at least one embodiment, the third bus 762 may be a peripheral bus for end-user consumer devices, represented by desktop devices 724 and communication devices 726, which may include various types of keyboards, computer mice, communication devices, data storage devices, bus expansion devices, etc. In certain embodiments, the third bus 762 represents a Universal Serial Bus (USB) or similar peripheral interconnect bus. In some embodiments, the fourth bus 721 may represent a computer interface bus for connecting mass storage devices, such as hard disk drives, optical drives, and disk arrays, which are generically represented by a persistent storage 728 that may be executable by the processor 701.

In at least one embodiment, the system 700 incorporates various features that facilitate a handheld or tablet type of operation and other features that facilitate laptop or desktop operation. In addition, in some embodiments, the system 700 includes features that cooperate to aggressively conserve power while simultaneously reducing latency associated with traditional power conservation performance objectives.

In at least one embodiment, the system 700 includes an operating system 740 that may be entirely or partially stored in the persistent storage 728. In some embodiments, the operating system 740 may include various modules, application programming interfaces, and the like that expose to varying degrees various hardware and software features of the system 700. In at least one embodiment, the system 700 includes a sensor application programming interface (API) 742, a resume module 744, a connect module 746, and a touchscreen user interface 748. In some embodiments, the system 700 may further include various hardware/firmware features including the capacitive or resistive touchscreen controller 714 and a second source of persistent storage such as a solid state drive (SSD) 750.

In some embodiments, the sensor API 742 provides application program access to one or more sensors (not depicted) that may be included in the system 700. Sensors that the system 700 might have in some embodiments include an accelerometer, a global positioning system (GPS) device, a gyrometer, an inclinometer, and a light sensor. The resume module 744 may, in some embodiments, be implemented as software that, when executed, performs operations for reducing latency when transitioning the system 700 from a power conservation performance objective to an operating performance objective. In at least one embodiment, the resume module 744 may work in conjunction with the SSD 750 to reduce the amount of SSD storage used when the system 700 enters a power conservation mode. The resume module 744 may, in some embodiments, flush standby and temporary memory pages before transitioning to a sleep mode. In some embodiments, by reducing the amount of system memory space that the system 700 preserves upon entering a low-power state, the resume module 744 beneficially reduces the amount of time to perform the transition from the low-power state to an operating performance objective. In at least one embodiment, the connect module 746 may include software instructions that, when executed, perform complementary functions for conserving power while reducing the amount of latency or delay associated with traditional "wake-up" sequences. The connect module 746 may, in some embodiments, periodically update certain "dynamic" applications including email and social network applications, so that, when the system 700 wakes from a low-power mode, the applications that are often most likely refresh are up-to-date. In at least one embodiment, the touchscreen user interface 748 supports the touchscreen controller 714 that enables user input via touchscreens traditionally reserved for handheld applications. In some embodiments, the inclusion of touchscreen support in conjunction with support for the communication devices 726 enables the system 700 to provide features traditionally found in dedicated tablet devices as well as features found in dedicated laptop and desktop systems.

Figure 8:
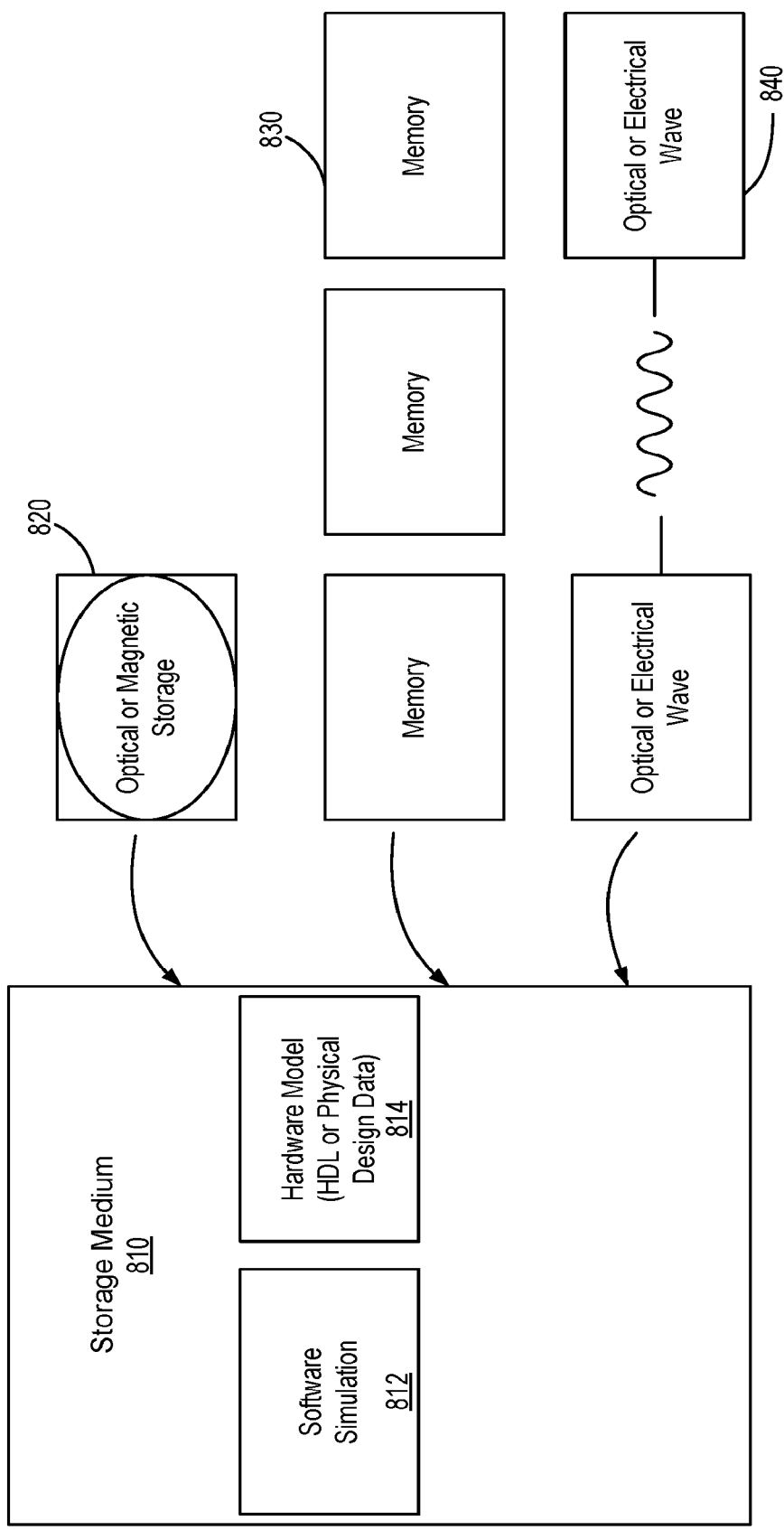
FIG. 8 is a schematic diagram of simulation, emulation and fabrication of a design consistent with embodiments disclosed herein.

FIG. 8 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, a hardware model 814 may be stored in a storage medium 810 such as a computer memory so that the hardware model 814 may be simulated using simulation software 812 that applies a particular test suite to the hardware model 814 to determine if it indeed functions as intended. In some embodiments, the simulation software 812 is not recorded, captured or contained in the storage medium 810.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine-readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine-readable medium. In some embodiments, an optical or electrical wave 840 modulated or otherwise generated to transmit such information, a memory 830, or a magnetic or optical storage 820, such as a disc, may be the tangible machine-readable medium. Any of these mediums may "carry" the design information. The term "carry" (e.g., a tangible machine-readable medium carrying information) thus covers information stored on a storage device or information encoded or modulated into or onto a carrier wave. The set of bits describing the design or the particular part of the design is (when embodied in a machine-readable medium such as a carrier or storage medium) an article that may be sold in and of itself or used by others for further design or fabrication.

Examples

The following examples pertain to further embodiments.

Example 1 is a system for power management of electronic system hardware. The system includes an energy distribution system, a first power sink, a first governor, a second power sink, a second governor, storage and one or more processors. The first power sink is attached to the energy distribution system. The first governor is designed to provide a first power state of the first power sink. The second power sink is attached to the energy distribution system. The second governor is designed to provide a second power state of the second power sink. The storage stores a payoff matrix including a first reward or first penalty for selecting from a set of first power states and a second reward or second penalty for selecting from a set of second power states. The processors are designed to receive a first power request from the first governor; receive a second power request from the second governor; and compute an optimum power distribution entry from the payoff matrix based in part on the payoff matrix, the first power request and the second power request. The processors can further select the first power state from the set of first power states based on the optimum power distribution entry; select the second power state from the set of second power states based on the optimum power distribution entry; provide the first governor with the first power state; and provide the second governor with the second power state.

In Example 2, the subject matter of Example 1 or any of the Examples described herein may further include one or more processors designed to adjust the payoff matrix.

In Example 3, the subject matter of Example 2 or any of the Examples described herein may further include adjusting the payoff matrix to further dynamically adjust a reward or a penalty.

In Example 4, the subject matter of Example 2 or any of the Examples described herein may further include adjusting the payoff matrix to further dynamically adjust a reward or a penalty based on battery percentage.

In Example 5, the subject matter of Example 1 or any of the Examples described herein may further include the payoff matrix to be statically configured.

In Example 6, the subject matter of Example 1 or any of the Examples described herein may further include the processors also designed to select the payoff matrix from a set of payoff matrices based on a system attribute.

In Example 7, the subject matter of Example 6 or any of the Examples described herein may further include the system attribute to determine whether the system is using external power or powered by a battery.

In Example 8, the subject matter of Example 1 or any of the Examples described herein may further include the optimum power distribution entry is a Nash Equilibrium.

In Example 9, the subject matter of Example 1 or any of the Examples described herein may further include the first power sink is a CPU.

In Example 10, the subject matter of Example 9 or any of the Examples described herein may further include the set of first power states containing a dynamic voltage and frequency scaling table.

In Example 11, the subject matter of Examples 1-10 or any of the Examples described herein may further include the processors contained in a power control unit.

In Example 12, the subject matter of Examples 1-10 or any of the Examples described herein may further include the processors forming part of an uncore for a processor.

In Example 13, the subject matter of Examples 1-10 or any of the Examples described herein may further include the processors representing a power sink where the processors coordinate to compute the optimum power distribution entry.

In Example 14, the subject matter of Examples 1-10 or any of the Examples described herein may further include the processors configured to authoritatively compute the optimum power distribution entry.

Example 15 is an apparatus for determining power distribution in an integrated chip. The apparatus contains an energy distribution system; a central processing unit (CPU) attached to the energy distribution system; a system on a chip (SOC) support circuitry attached to the energy distribution system; and storage for a set of payoff matrices. Each matrix contains a set of entries. Each entry contains a first reward or first penalty for selecting from a set of first power states, and a second reward or second penalty for selecting from a set of second power states. Each matrix is associated with a power attribute. The apparatus includes one or more processors are designed to receive a request from the CPU for a first power state; select a matrix from the set of payoff matrices based in part on a status of the power attribute; compute an optimum power distribution entry from the matrix based in part on the first power state, the first reward or the first penalty, and the second reward or the second penalty; select a first power state from the set of first power states based on the optimum power distribution entry; select a second power state from the set of second power states based on the optimum power distribution entry; adjust the CPU to use the first power state; and adjust the SOC support circuitry to use the second power state.

In Example 16, the subject matter of Example 15 or any of the Examples described herein may further include a graphics processing unit (GPU) attached to the energy distribution system, where the processors are further designed to receive another request from the GPU for a third power state; select the third power state from a set of third power states based on the optimum power distribution entry; and adjust the GPU to use the first power state. Computing the optimum power distribution entry further includes entry from the matrix based in part on the first power state, the third power state, the first reward or the first penalty, the second reward or the second penalty, and a third reward or a third penalty. Each matrix entry includes a reward or a penalty for the third reward or the third penalty associated with the third power state.

In Example 17, the subject matter of Example 15 or any of the Examples described herein may further include determining whether the power attribute is on battery power.

In Example 18, the subject matter of Example 15 or any of the Examples described herein may further include processors designed to adjust matrices based on outcome.

In Example 19, the subject matter of Example 15 or any of the Examples described herein may further include the CPU containing a governor that transmits the request from the CPU for the first power state.

In Example 20, the subject matter of Example 15 or any of the Examples described herein may further include the request from the CPU for the first power state to be based in part on a CPU load.

In Example 21, the subject matter of Example 15 or any of the Examples described herein may further include the first power state to be a P-state from a P-state table.

Example 22 is a computer program product containing a computer-readable storage medium storing program code. The computer-readable storage medium storing program code causes the processors to perform a method. The method includes evaluating a system state for rewards or penalties of selecting a group of power states of a power distribution system for a set of circuitry; computing an equilibrium based at least in part on the system state including the set of circuitry; executing the group of power states for the set of circuitry associated with the equilibrium; evaluating the system state based on the executed group of power states; and revising the rewards or penalties.

In Example 23, the subject matter of Example 22 or any of the Examples described herein may further include, where evaluating the system state also includes determining whether the system is using internal power or external power; revising the rewards or penalties, and further, when on the internal power, altering the rewards or penalties for social utility; and when on the external power, altering the rewards for performance.

In Example 24, the subject matter of Example 22 or any of the Examples described herein may further include, where computing the equilibrium also includes computing a Nash Equilibrium.

In Example 25, the subject matter of Example 22 or any of the Examples described herein may further include, where computing the equilibrium also includes computing a social optimum equilibrium.

In Example 26, the subject matter of Example 22 or any of the Examples described herein may further include the system state to include power demand.

In Example 27, the subject matter of Example 22 or any of the Examples described herein may further include the system state to determine whether the system is receiving external power.

In Example 28, the subject matter of Example 22 or any of the Examples described herein may further include, where evaluating the system state also includes forming a model of the system as a cooperative set of demands for power.

In Example 29, the subject matter of Example 28 or any of the Examples described herein may further include the model to contain an objective to reduce overall system power.

In Example 30, the subject matter of Example 28 or any of the Examples described herein may further include the model to contain an objective to reduce device idle power.

In Example 31, the subject matter of Example 28 or any of the Examples described herein may further include the model to contain an objective to reduce hardware idle power.

In Example 32, the subject matter of Example 22 or any of the Examples described herein may further include, where evaluating the system state also includes forming a model of the system as a non-cooperative set of demands for power.

In Example 33, the subject matter of Example 32 or any of the Examples described herein may further include, where the non-cooperative set of demands for power are offset by consumed energy credits.

In Example 34, the subject matter of Example 32 or any of the Examples described herein may further include the non-cooperative set of demands for power to include a thermal policy.

Example 35 is a method for power state selection. The method includes receiving a first power request from a first governor coupled to a first circuit; receiving a second power request from a second governor coupled to a second circuit; and computing an optimum power distribution entry from a payoff matrix based in part on the payoff matrix. The method further includes selecting a first power state from a set of first power states based on the optimum power distribution entry; selecting a second power state from a set of second power states based on the optimum power distribution entry; providing the first governor with the first power state; and providing the second governor with the second power state.

In Example 36, the subject matter of Example 35 or any of the Examples described herein may further include adjusting the payoff matrix after providing the first governor with the first power state.

In Example 37, the subject matter of Example 35 or any of the Examples described herein may further include selecting the payoff matrix from a set of payoff matrices based on a system attribute.

Example 38 is an apparatus containing a procedure to perform a method as indicated in any of Examples 35-37.

Example 39 is a machine-readable storage including machine-readable instructions, which, when executed, implement a method or realize an apparatus as indicated in any of Example 35-37.

Example 40 is a machine-readable medium including code, which, when executed, causes a machine to perform the method of any one of Example 35-37.

Example 41 is an apparatus for power state selection. The apparatus include a method for evaluating a system state for rewards or penalties of selecting a variety of power states of a power distribution system for a set of circuitry; a method for computing an equilibrium based in part on the system state including the set of circuitry; a method for executing the variety of power states for the set of circuitry associated with the equilibrium; a method for evaluating the system state based on the executed variety of power states; and a method for revising the rewards or penalties.

In Example 42, the subject matter of Example 41 or any of the Examples described herein may further include the method for evaluating the system state which also includes a method for determining whether the system is using internal power or external power; and a method for revising the rewards or penalties which also includes a method for altering the rewards or penalties for social utility when on the internal power; and a method for altering the rewards for performance when on the external power.

In Example 43, the subject matter of Example 41 or any of the Examples described herein may further include a method for computing the equilibrium which also includes a method for computing a Nash Equilibrium.

In Example 44, the subject matter of Example 41 or any of the Examples described herein may further include a method for computing the equilibrium which also includes a method for computing a social optimum equilibrium.

In Example 45, the subject matter of Example 41 or any of the Examples described herein may further include a method for evaluating the system state which also includes a method for forming a model of the system as a cooperative set of demands for power.

In Example 46, the subject matter of Example 45 or any of the Examples described herein may further include the model containing an objective to reduce overall system power.

In Example 47, the subject matter of Example 45 or any of the Examples described herein may further include the model containing an objective to reduce device idle power.

In Example 48, the subject matter of Example 45 or any of the Examples described herein may further include the model containing an objective to reduce hardware idle power.

In Example 49, the subject matter of Example 41 or any of the Examples described herein may further include, where evaluating the system state also includes forming a model of the system as a non-cooperative set of demands for power.

In Example 50, the subject matter of Example 49 or any of the Examples described herein may further include the non-cooperative set of demands for power offset by consumed energy credits.

In Example 51, the subject matter of Example 49 or any of the Examples described herein may further include the non-cooperative set of demands for power to also include a thermal policy.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc. that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of the embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus to determine power distribution in an integrated chip, comprising:
   an energy distribution system;
   a central processing unit (CPU) coupled to the energy distribution system;
   a system on a chip (SOC) support circuitry coupled to the energy distribution system;
   storage for a set of payoff matrices, each matrix comprising a set of entries, each entry comprising a first reward or first penalty to select from a set of first power states and a second reward or second penalty to select from a set of second power states, each matrix associated with a power attribute; and
   one or more processors configured to:
      receive a request from the CPU for a first power state;
      select a matrix from the set of payoff matrices based at least in part on a status of the power attribute;
      compute an optimum power distribution entry from the matrix based at least in part on the first power state, the first reward or the first penalty, and the second reward or the second penalty;
      select a first power state from the set of first power states based on the optimum power distribution entry;
      select a second power state from the set of second power states based on the optimum power distribution entry;
      adjust the CPU to use the first power state;
      adjust the SOC support circuitry to use the second power state; and
      dynamically adjust at least one of the first reward, the first penalty, the second reward, and the second penalty of the matrix based on an outcome.

2. The apparatus of claim 1, further comprising a graphics processing unit (GPU) coupled to the energy distribution system,
   wherein the one or more processors are further configured to:
      receive another request from the GPU for a third power state;
      select the third power state from a set of third power states based on the optimum power distribution entry; and
      adjust the GPU to use the first power state;
   wherein to compute the optimum power distribution entry further comprises to compute the optimum power distribution entry from the matrix based at least in part on the first power state, the third power state, the first reward or the first penalty, the second reward or the second penalty, and a third reward or a third penalty, and
   wherein each matrix entry comprises a reward or a penalty for the third reward or the third penalty associated with the third power state.

3. The apparatus of claim 1, wherein the power attribute is whether the apparatus is on battery power.

4. The apparatus of claim 1, wherein the CPU further comprises a governor that transmits the request from the CPU for the first power state.

5. The apparatus of claim 1, wherein the request from the CPU for the first power state is based at least in part on a CPU load.

6. The apparatus of claim 1, wherein the first power state is a P-state from a P-state table.

7. A computer program product comprising a computer-readable storage medium storing program code for causing one or more processors to perform a method, the method comprising:
   evaluating a system state for rewards or penalties of selecting a plurality of power states of a power distribution system for a set of circuitry;
   computing an equilibrium based at least in part on the system state including the set of circuitry;
   executing the plurality of power states for the set of circuitry associated with the equilibrium;
   evaluating the system state based on the executed plurality of power states; and
   dynamically revising the rewards or penalties based on outcome.

8. The computer program product of claim 7, wherein:
   evaluating the system state further comprises determining whether the system is using internal power or external power;

revising the rewards or penalties further comprises:
 when on the internal power, altering the rewards or penalties for social utility; and
 when on the external power, altering the rewards for performance.

9. The computer program product of claim 7, wherein computing the equilibrium further comprises computing a Nash equilibrium.

10. The computer program product of claim 7, wherein computing the equilibrium further comprises computing a social optimum equilibrium.

11. The computer program product of claim 7, wherein the system state includes power demand.

12. The computer program product of claim 7, wherein the system state includes whether the system is receiving external power.

13. The computer program product of claim 7, wherein evaluating the system state further comprises forming a model of the system as a non-cooperative set of demands for power.

14. The computer program product of claim 13, wherein the non-cooperative set of demands for power further comprise a thermal policy.

\* \* \* \* \*